(12) United States Patent
Ikehara et al.

(10) Patent No.: US 10,267,352 B2
(45) Date of Patent: Apr. 23, 2019

(54) BEARING CAP OF INTERNAL COMBUSTION ENGINE

(71) Applicant: NISSAN MOTOR CO., LTD., Yokohama-shi, Kanagawa (JP)

(72) Inventors: Kensuke Ikehara, Kanagawa (JP); Hiroaki Mochida, Kanagawa (JP); Daisuke Shibata, Kanagawa (JP); Atsushi Hashimoto, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/513,323

(22) PCT Filed: Oct. 3, 2014

(86) PCT No.: PCT/JP2014/076603
§ 371 (c)(1),
(2) Date: Mar. 22, 2017

(87) PCT Pub. No.: WO2016/051600
PCT Pub. Date: Apr. 7, 2016

(65) Prior Publication Data
US 2017/0314507 A1  Nov. 2, 2017

(51) Int. Cl.
*F16C 35/02* (2006.01)
*F16C 9/02* (2006.01)
*F02F 7/00* (2006.01)

(52) U.S. Cl.
CPC ............. *F16C 9/02* (2013.01); *F02F 7/0053* (2013.01); *F16C 35/02* (2013.01); *F05C 2201/0439* (2013.01); *F05C 2251/042* (2013.01)

(58) Field of Classification Search
CPC .... F16C 9/02; F16C 9/04; F16C 35/02; F02F 7/0053
See application file for complete search history.

(56) References Cited

U.S. PATENT DOCUMENTS 5,769,546 A     6/1998  Wuest

FOREIGN PATENT DOCUMENTS

| DE | 19532326      | * | 1/1997  |
|----|---------------|---|---------|
| JP | 63-34345      | U | 3/1988  |
| JP | H09-126223    | A | 5/1997  |
| JP | 2002-349342   | A | 12/2002 |

OTHER PUBLICATIONS

Translaton of JP 63-34345 obtained Mar. 5, 2018.*

* cited by examiner

*Primary Examiner* — James Pilkington
(74) *Attorney, Agent, or Firm* — Drinker Biddle & Reath LLP

(57) ABSTRACT

A bearing cap (1) is attached to a bulkhead (22) of a cylinder block (21) made of a light metal through a pair of bolts (24). The bearing cap (1) has a frame (2) made of an iron-based metal and a cast light-alloy part (3). The frame (2) has a pair of pillar parts (9) through which the bolts (24) extend and a circular-arc-shaped arch section (10). At high temperatures, the span of the pair of the bolts (24) increases due to thermal expansion of the light-alloy material, and the pair of the pillar parts (9) expand. This causes the middle part of the arch section (10) to shift upward, thereby suppressing an increase in bearing clearance.

4 Claims, 6 Drawing Sheets

BEARING CAP OF INTERNAL COMBUSTION ENGINE

TECHNICAL FIELD

The present invention relates to a bearing cap of an internal combustion engine, and particularly to improvement of a bearing cap in which a light-alloy material is partially used.

BACKGROUND TECHNOLOGY

In recent years, the most of cylinder blocks of internal combustion engines have been made of a light alloy such as an aluminum alloy. In contrast with this, crankshafts are made of copper having a relatively low thermal expansion coefficient, and if bearing caps are made of a light alloy such as an aluminum alloy, bearing clearance is enlarged at warm time due to the thermal expansion difference between the crankshaft and the bearing cap, and hammering sound by combustion force occurs.

In patent documents 1 and 2, there is disclosed a configuration in which an iron-based member is inserted into each of the semi-circular concave portion of a cylinder block made of a light alloy and a bearing cap made of a light alloy to suppress the enlargement of the bearing clearance. In this configuration, the entire periphery of a main bearing part is surrounded with the iron-based member, and thereby the thermal expansion of the main bearing part is suppressed.

However, in this way, in the configuration in which the iron-based material is also inserted into the cylinder block, there are problems that an increase in the weight of the cylinder block occurs and the manufacturing process of the cylinder block becomes complicated.

An object of the present invention is to provide a bearing cap mainly made of a light alloy, which is capable of suppressing an increase in bearing clearance at warm time without a particular change in the configuration of a cylinder block made of a light alloy.

PRIOR ART REFERENCES

Patent Documents

Patent Document 1: Japanese Patent Application Publication H09-126223
Patent Document 2: Japanese Patent Application Publication 2002-349342

SUMMARY OF THE INVENTION

As to the present invention, a bearing cap of an internal combustion engine, which is attached to a bulkhead of a cylinder block made of a light metal through bolts, and forms a main bearing part with a semi-circular-shaped concave portion of the cylinder block, has: a frame made of an iron-based metal; and a light-alloy part which is cast so as to cast the frame into the light-alloy part, wherein the frame has a pair of linear pillar parts including bolt through holes through which the bolts extend, and a circular-arc-shaped arch section connecting distal end portions of the pair of the pillar parts to each other.

As compared with the frame made of the iron-based metal, the thermal expansion coefficients of the cylinder block and the light-alloy part which are made of a light alloy are relatively high. Consequently, when temperature rises, the span between the bolts of the bulkhead, bolts which fix the bearing cap to the bulkhead, increases and the light-alloy part thermally expands, and the pair of the pillar parts of the frame expand so as to be separated from each other. As a result of this, the middle part of the arch section shifts radially inward. With this shift, an increase in bearing clearance along a vertical direction is suppressed.

MODE FOR IMPLEMENTING THE INVENTION

Figure 1:
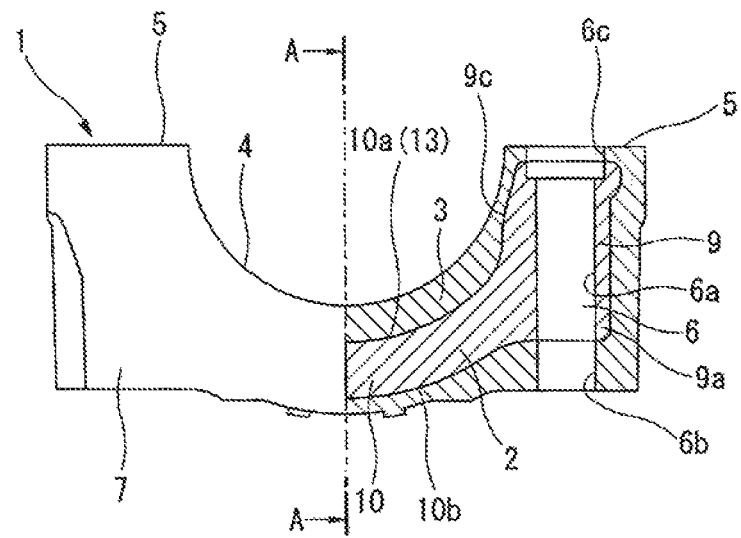
FIG. 1 shows a half sectional view of a bearing cap according to the present invention.
Figure 2:
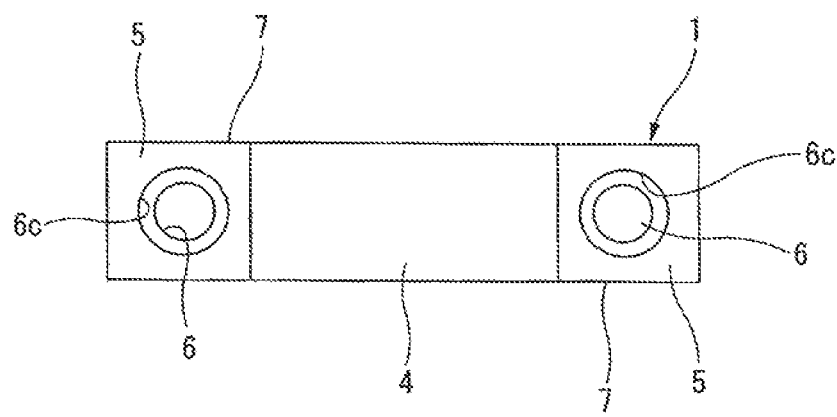
FIG. 2 is a plan view of the bearing cap.
Figure 3:
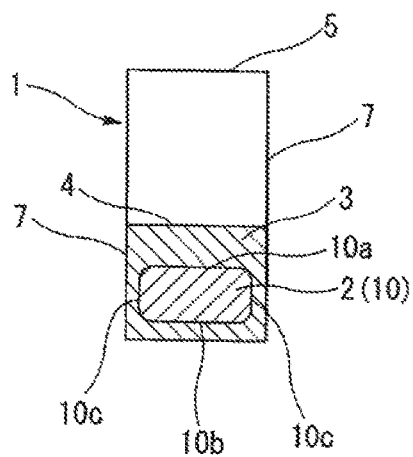
FIG. 3 is a sectional view taken along a line A-A of FIG. 1.

In the following, an embodiment of the present invention will be explained in detail based on the drawings. FIG. 1 to FIG. 3 show an embodiment of a bearing cap 1 according to the present invention. Bearing cap 1 has a configuration in which a frame 2 made of an iron-based metal is cast inside a light-alloy part 3 made of a light alloy material such as an aluminum alloy. Frame 2 formed in advance is arranged inside a mold, and the casting of light-alloy part 3 is performed using the light-alloy material, and thereby both of them are integrated.

Bearing cap 1 has a bearing surface 4 formed by a semi-cylindrical surface which forms the lower half part of a main bearing part, and both of the sides of bearing surface 4 have respective joining surfaces 5 which are a pair, joining surfaces 5 in which machining had been performed. In addition, a pair of bolt through holes 6 are provided so as to extend through respective joining surfaces 5. The pair of bolt through holes 6 extend parallel to each other, and are arranged at both of the sides of bearing surface 4. In addition, end surfaces 7 of the front and back of bearing cap 1 basically form a flat surface along a plane orthogonal to a crankshaft axial direction.

Figure 4:
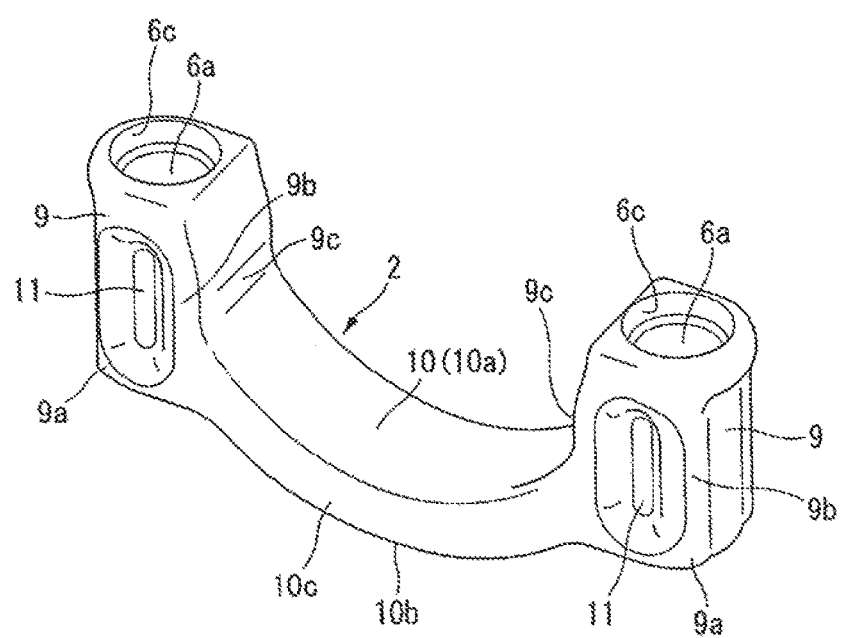
FIG. 4 is a perspective view of a frame.

Frame 2 is formed as one member having a predetermined shape by casting or forging using an iron-based metal such as a cast iron and a copper as a material. As shown in FIG. 4, frame 2 has a pair of pillar parts 9 having bolt through holes 6a and a circular-arc-shaped arch section 10 connecting the pair of pillar parts 9 to each other.

Pillar parts 9 have a rectangular parallelepiped shape extending linearly parallel to bolt through holes 6a (that is, a direction orthogonal to joining surface 5), and the arch section 10 is connected to side surfaces of distal end portions 9a of pillar parts 9. End surfaces 9b of pillar parts 9 which face the crankshaft axial direction are formed with respective concave portions 11 to obtain physical engagement with light-alloy part 3.

As shown in FIG. 1, arch section 10 extends concentric with bearing surface 4. More specifically, also as shown in FIG. 3, arch section 10 has a rectangular shape in a cross section which is surrounded by an inner peripheral surface 10a, an outer peripheral surface 10b, which have respective cylindrical surfaces concentric with bearing surface 4, and a pair of end surfaces 10c along a plane orthogonal to the crankshaft axial direction. In addition, the radial thickness between inner peripheral surface 10a and outer peripheral surface 10b is set smaller than the axial direction length between the end surfaces 10c, 10c. That is, the sectional shape of each part of arch section 10 along the radial line of bearing surface 4 is fixed except a connection part with each of pillars 9, and is a long rectangular shape in the crankshaft axial direction.

Here, when a semicircle in which inner peripheral surface 10a of arch section 10 is temporally extended 180 degrees is virtually formed, inner side surfaces 9c opposed to each other in the pair of pillar parts 9 project inward from the virtual semicircle. That is, circular-arc-shaped arch section 10 exists within an angle range smaller than 180 degrees, and both of the end portions of inner peripheral surface 10a are connected to inner side surfaces 9c of pillar parts 9, which project inward. In addition, the pair of inner side surfaces 9c extend parallel to each other in connection parts with arch section 10.

Light-alloy part 3 covers the whole frame 2, and each of bearing surface 4, joining surfaces 5 and end surfaces 7 as bearing cap 1 is formed of light-alloy part 3. That is, as apparent from FIG. 1 and FIG. 3, frame 2 is embedded inside light-alloy part 3 and not exposed to the outside of bearing cap 1. However, as to bolt through hole 6, bolt through hole 6a of frame 2 is continuous to a bolt through hole 6b of light-alloy part 3 part as a part of bolt through hole 6 of bearing cap 1. In other words, the inner peripheral surface of bolt through hole 6a of frame 2 is not covered with light-alloy part 3. In addition, a large diameter portion 6c formed by enlarging the diameter of bolt through hole 6 is provided at each of the opening end portions of joining surfaces 5 in bolt through holes 6. This large diameter portion 6c is formed across light-alloy part 3 covering joining surface 5 and pillar part 9 of frame 2.

Since light-alloy part 3 is cast so as to cast frame 2 into light-alloy part 3, light-alloy part 3 is solidified in a form in which light-alloy part 3 enters concave portion 11, in concave portion 11 of pillar part 9 in frame 2. Consequently, light-alloy 3 and frame 2 are engaged firmly and physically in concave portion 11, and in particular, the transmission of force in a direction along end surface 9b of pillar part 9 of frame 2 is performed.

As shown in FIG. 1, when bearing cap 1 is viewed in a section along a plane orthogonal to the crankshaft axial direction, a boundary 13 at the inner peripheral side of frame 2 between light-alloy part 3 and frame 2 is defined by inner peripheral surface 10a of arch section 10 and inner side surface 9c of pillar part 9 of frame 2. With this, a distance from bearing surface 4 to boundary 13 (in other words, a radial thickness of light-alloy part 3 which exists at the inner peripheral side of frame 2) is constant at each part in arch section 10, and a distance from bearing surface 4 to the boundary 13 in pillar part 9 is shorter than the distance in arch section 10.

In addition, as shown in FIG. 3, in a radial section of bearing cap 1 along the crankshaft axial direction, light-alloy part 3 is cast into a rectangular cross-sectional shape so as to surround the entire periphery of arch section 10 having a rectangular shape in a cross section. Bearing surface 4 is formed at the inner peripheral surface of light-alloy part 3, and arch section 10 is embedded at the middle part of bearing surface 4 in the crankshaft axial direction. That is, bearing surface 4 formed over the substantially entire length of bearing cap 1 in the crankshaft axial direction projects from each of end surfaces 10c of arch section 10 in the crankshaft axial direction (a left and right direction in FIG. 3).

Figure 5:
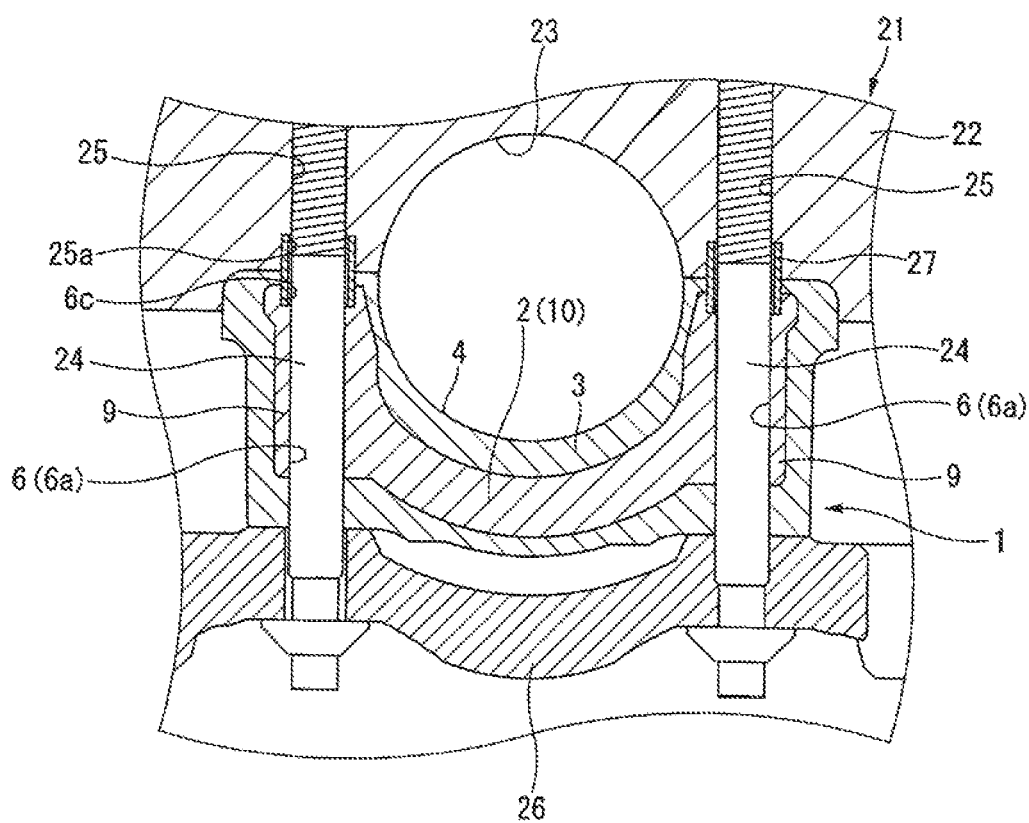
FIG. 5 is a sectional view showing a state in which the bearing cap has been attached to a cylinder block.

Next, FIG. 5 shows a state in which bearing cap 1 configured as above has been attached to the lower edge of a bulkhead 22 of a cylinder block 21. Cylinder block 21 is cast by a manufacturing method such as die-casting using a light-alloy material such as an aluminum alloy, and a semi-circular-shaped concave portion 23 forming the upper half part of the main bearing part is formed at the lower edge of bulkhead 22. Bearing cap 1 is fixed to the lower edge of bulkhead 22 through a pair of bolts 24, and forms the main baring part with semi-circular-shaped concave portion 23 of bulkhead 22 side. Bolts 24 extend through bolt through holes 6 of bearing cap 1 and are screwed to screw holes 25 of bulkhead 22. In addition, it is possible to use a stud bolt as bolt 24 in combination with a nut arranged at the outside of bearing cap 1. Moreover, in the embodiment shown in the drawing, a beam member 26 connecting a plurality of the main bearing parts in the crankshaft axial direction is arranged so as to be stacked under the lower surface of bearing cap 1. This beam member 26 and bearing cap 1 are fixed in a so-called common fastening manner by the pair of bolts 24, and this beam member 26 is, however, not always essential for the present invention.

Here, the diameter of bolt through hole 6 (6a, 6b) is set so as to minimize the gap between bolt through hole 6 and the outer peripheral surface of bolt 24. That is, in a state in which bolt 24 has been inserted into bolt through hole 6 (6a, 6b), the inner peripheral surface of bolt through hole 6 practically contacts the outer peripheral surface of bolt 24. In addition, a large diameter part 25a is also formed at each of the opening ends of screw holes 25 at cylinder block 21 side, to correspond to each of large diameter portions 6c at the upper ends of bolt through holes 6, and a short metal tube 27 is arranged across large diameter portion 6c of each of bolt-through hole 6 and large diameter part 25a of each of screw holes 25.

In the above configuration, as compared with frame 2 made of the iron-based metal, the thermal expansion coefficients of cylinder block 21 and light-alloy part 3, which are made of a light alloy such as an aluminum alloy, are relatively high. The span (an interval in a left and right direction in FIG. 5) between the pair of bolts 24 of bulkhead 22, bolts 24 which fix bearing cap 1, consequently increases when temperature increases caused by the operation of an engine. At the same time of this, light-alloy part 3 which occupies a large part of bearing cap 1 also thermally expands, and consequently, the pair of pillar parts 9 of frame 2, which have a relatively small thermal expansion, expand so as to be separated from each other. As a result of this, the middle part of arch section 10 connecting the pair of pillar parts 9 shifts upward. In other words, it shifts radially inward. With this shift, the enlargement of the bearing clearance along a vertical direction can be suppressed.

Figure 6:
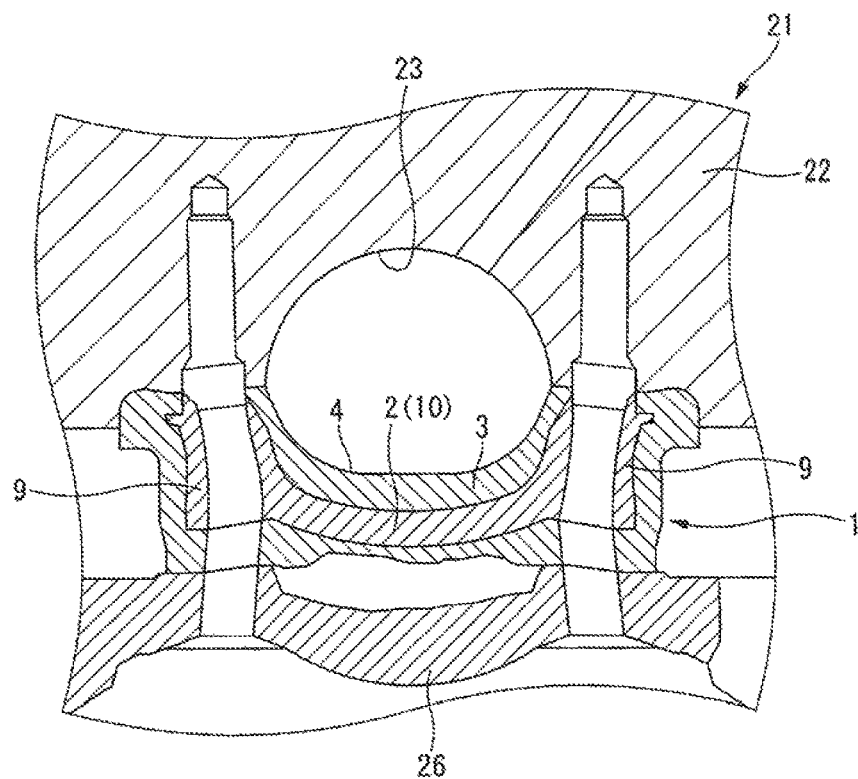
FIG. 6 is a sectional view exaggeratedly showing a deformation state caused by thermal expansion.

FIG. 6 is an explanation drawing in which the deformation of each part caused by the thermal expansion is enlarged and drawn by simulation. As shown in the drawing, the pair of pillar parts 9 expand so as to be separated from each other, and the middle part of arch section 10, as a result, shifts upward, and light-alloy part 3 surrounding arch section 10 is lifted up. Consequently, bearing surface 4 of bearing cap 1 which forms the lower half part of the main bearing part is deformed in an elliptical shape. With this deformation, as compared with the enlargement (thermal expansion) of a diameter of the main bearing part in the left and right direction in FIG. 6, the enlargement of a diameter of the main bearing part in the vertical direction in FIG. 6 becomes small, and thereby, for example, deterioration of hammering sound caused by an excessive bearing clearance is suppressed.

Figure 7:
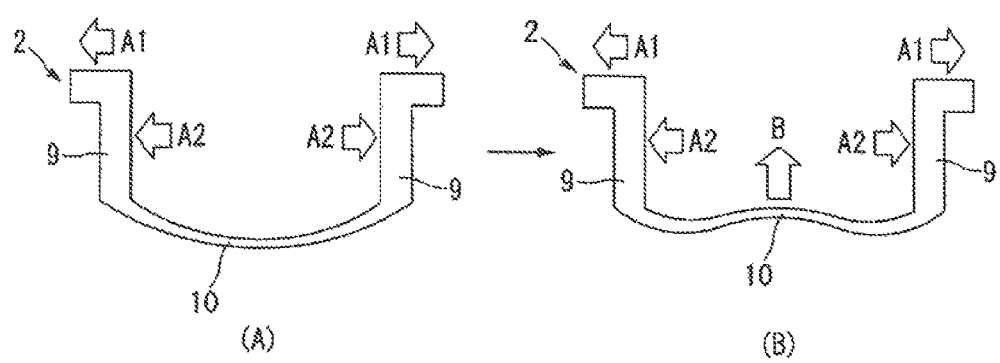
FIG. 7 is an explanation drawing explaining a change in the shape of the frame from a room temperature (A) to a high temperature (B).

FIG. 7 is an explanation drawing schematically showing the deformation of frame 2. At the time of a room temperature (for example 20° C.) in FIG. (A), frame 2 keeps an initial state shown in FIG. 4. A force shown by an arrow A1 caused by the thermal expansion of cylinder block 21 and a force shown by an arrow A2 caused by the thermal expansion of light-alloy part 3 act on the pair of pillar parts 9 in an expanding direction, with a rise in temperature. With this expansion of pillar parts 9, at the time of a high temperature (for example, 80° C.) shown in FIG. (B), a force shown by an arrow B is generate upward at the middle part of arch section 10.

Figure 8A:
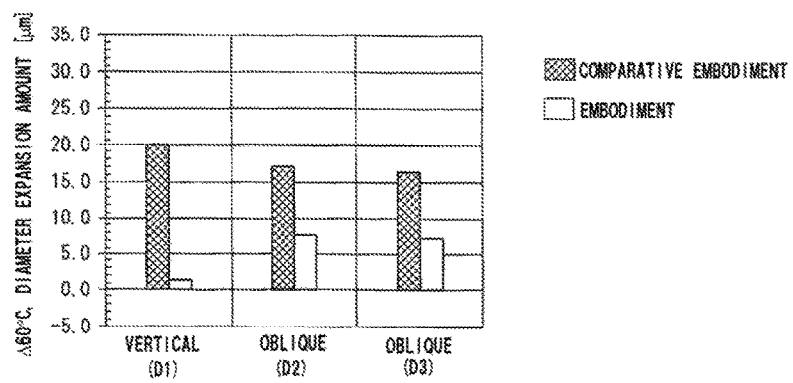
FIG. 8 is a graph showing a case where a diameter expansion amount of the present embodiment is compared with that of a comparative embodiment caused by a change in temperature.
Figure 8B:
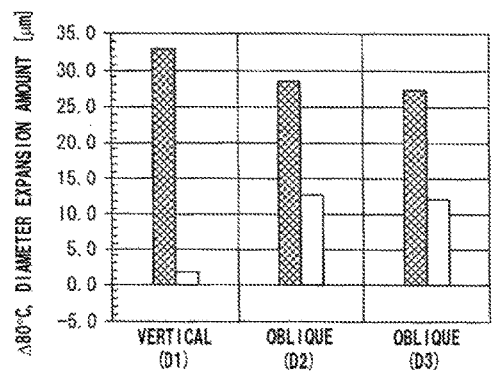
Figure 8C:
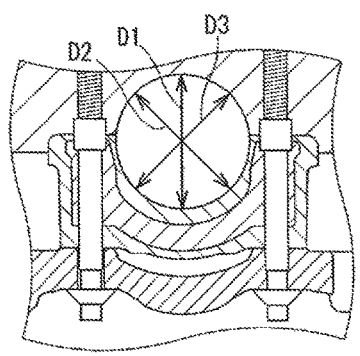

FIG. 8 shows an experimental result of the expansion of the diameter of the main bearing part, in which bearing cap 1 having the above configuration is used, caused by the thermal expansion. Here, as a comparative embodiment, a diameter expansion amount in a case where a bearing cap wholly made of an aluminum alloy which is the same as the material of light-alloy part 3 is used is shown in FIG. 8 with the above experimental result. In addition, as to three directions of respective D1, D2 and D3 shown in FIG. (C), there are shown a diameter expansion amount when temperature increases by 60° C. from 20° C. to 80° C. (FIG. (A)) and a diameter expansion amount when temperature increases by 80° C. from 20° C. to 100° C. (FIG. (B)). As shown in these FIGS, as compared with the case where the bearing cap wholly made of the aluminum alloy is used, in a case where bearing cap 1 in the embodiment is used, the expansion of the diameter of the main bearing in the vertical direction (D1) remarkably becomes small. In addition, as to oblique directions of respective D2 and D3, a result that the expansion of the diameter in each of these directions was reduced by half was obtained.

Thus, according to bearing cap 1 of the above embodiment, the most part of bearing cap 1 is made of the light-alloy material, and thereby the weight of the bearing cap is reduced and the increase in the bearing clearance at the warm time is suppressed.

However, the light-alloy material forming light-alloy part 3 in bearing cap 1 is not necessary to be the same as the light-alloy material forming cylinder block 21, and each of them can be made by using an appropriate light-alloy material.

Figure 9:
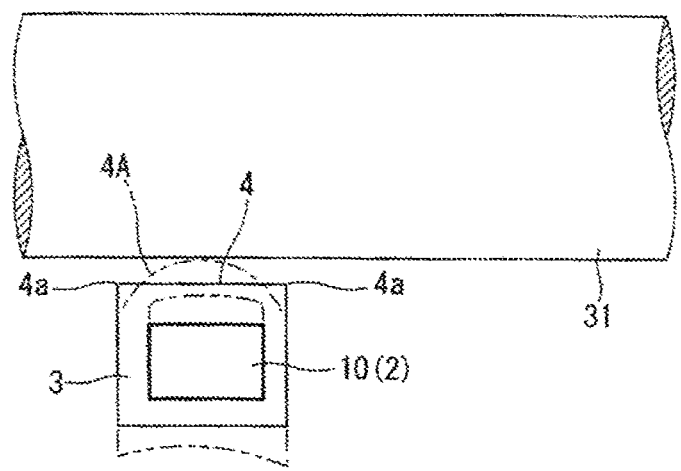
FIG. 9 is a sectional view showing a change in a bearing surface caused by the deformation of the frame.

In addition, as described above, FIG. 9 shows a section of bearing cap 1 along the crankshaft axial direction when arch section 10 shifts upward at the warm time. As mentioned above, since arch section 10 is positioned in the middle part of bearing surface 4 in the axial direction, when arch section 10 shifts upward, the middle part of bearing surface 4 in the axial direction is mainly pressed upward. Consequently, as exaggeratedly shown by a virtual line 4A in FIG. 9, bearing surface 4 formed of light-alloy part 3 becomes a convex surface of which the middle part of bearing surface 4 in the crankshaft axial direction expands inward. With this expansion, even if a journal part 31 of the crankshaft is inclined by the alternate combustion load and inertial force of each cylinder, end edges 4a at both ends of bearing surface 4 in the axial direction, that is, the edges of both of the ends do not locally contact the outer peripheral surface of journal part 31.

In this way, in the above embodiment, it is possible to obtain an ideal convex surface shape as bearing surface 4 at the time of the actual operation of the engine without performing a complicated machining for forming the convex surface on bearing surface 4, because it is sufficient to machine bearing surface 4 itself into a simple cylindrical surface at room temperature.

The invention claimed is:

1. A bearing cap of an internal combustion engine, which is attached to a bulkhead of a cylinder block, made of a light weight metal, through bolts, and forms a main bearing part with a semi-circular-shaped concave portion of the cylinder block, comprising:
 a frame made of an iron-based metal; and
 a light weight alloy part which is cast so as to cast the frame into the light weight alloy part,
 wherein the frame has a pair of linear pillar parts including bolt through holes through which the bolts extend, and a circular-arc-shaped arch section connecting distal end portions of the pair of the pillar parts to each other,
 wherein the pillar parts comprise end surfaces which face a crankshaft axial direction, the end surfaces are formed with concave portions, and
 wherein the light weight alloy part fills the concave portions.

2. The bearing cap of the internal combustion engine according to claim 1, wherein a radial distance from a bearing surface formed of the light weight alloy part to a boundary between the light weight alloy part and the arch section is constant in the arch section, and a radial distance from the bearing surface to a boundary between the light weight alloy part and the pillar parts is shorter than the radial distance between the bearing surface to the boundary between the light weight alloy part and the arch section, in a cross section along a plane orthogonal to the crankshaft axial direction.

3. The bearing cap of the internal combustion engine according to claim 1, wherein a whole of the frame is covered with the light weight alloy part.

4. The bearing cap of the internal combustion engine according to claim 1, wherein the arch section is embedded at a middle part of the light weight alloy part in the crankshaft axial direction.

* * * * *